US006534600B2

(12) United States Patent
Dvornic et al.

(10) Patent No.: US 6,534,600 B2
(45) Date of Patent: Mar. 18, 2003

(54) HYPERBRANCHED POLYUREAS, POLYURETHANES, POLYAMIDOAMINES, POLYAMIDES AND POLYESTERS

(75) Inventors: Petar R. Dvornic, Midland, MI (US); Jin Hu, Midland, MI (US); Dale J. Meier, Midland, MI (US); Robert M. Nowak, Midland, MI (US); Paul L. Parham, Bay City, MI (US)

(73) Assignee: Michigan Molecular Institute, Midland, MI (US)

(*) Notice: Subject to any disclaimer, the term of this patent is extended or adjusted under 35 U.S.C. 154(b) by 0 days.

(21) Appl. No.: 09/817,859

(22) Filed: Mar. 26, 2001

(65) Prior Publication Data

US 2002/0161113 A1 Oct. 31, 2002

(51) Int. Cl.$^7$ .................................................. C08L 83/06
(52) U.S. Cl. .................. 525/474; 525/437; 525/452; 525/450; 528/271; 528/355; 528/44; 528/33
(58) Field of Search ...................... 525/437, 452, 525/420, 474; 528/271, 355, 44, 33

(56) References Cited

U.S. PATENT DOCUMENTS

| | | | |
|---|---|---|---|
| 5,418,301 A | | 5/1995 | Hult et al. |
| 5,739,218 A | | 4/1998 | Dvornic et al. |
| 5,902,863 A | | 5/1999 | Dvornic et al. |
| 5,938,934 A | | 8/1999 | Balogh et al. |
| 6,001,945 A | * | 12/1999 | Decker et al. |
| 6,100,350 A | | 8/2000 | Wilczek et al. |
| 6,107,408 A | | 8/2000 | Quirk et al. |

FOREIGN PATENT DOCUMENTS

WO        WO98/30604        7/1998

OTHER PUBLICATIONS

Newkome, G.R, Baker, G.R.; "Macromolecular Nomenclature Note No. 7", *Polymer Preprints*, vol. 35, No. 2, Aug. 1994, American Chemical Society, Jul. 5, 1994, pp. 6–9.
Gopala, A., Wu, H.,Xu, J, Heiden, P.; "Investigation of Readily Processable Thermoplastic–Toughened Thermosets: IV. BMIs Toughened with Hyperbranched Polyester", *Journal of Applied Polymer Science*, vol. 71, 1999, pp. 1809–1817.
Wu, H., Xu, J., Liu, Y., Heiden, P.; "Investigation of Readily Processable Thermoplastic–Toughened Thermosets. V. Epoxy Resin Toughened with Hyperbranched Polyester", *Journal of Applied Polymer Science*, vol. 72, 1999, pp. 151–163.
Boogh, L., Petterson, B., Japon, S., Månson, J.-A.; "A Novel Toughening System for Thermoset Resins and its Composites"; *Proceedings of ICCM–10*, Whistler, B.C., Canada, Aug. 1995; pp. VI–389–VI–396.

Litt, M., Levy, A., Herz, J.; "Polymerization of Cyclic Imino Ethers. X., Kinetics, Chain Transfer, and Repolymerization"; *J. Macromol., Sci.–Chem.*.; A9(5), 1975, pp. 703–727.
Kienle, R.H., Van Der Meulen, P.A., Petke, F.E.; "The Polyhydric Alcohol–Polybasic Acid Reaction. III. Further Studies of the Glycerol–Phthalic Anhydride Reaction"; The Glycerol–Phthalic Anhydride Reaction; vol. 61; Sep. 1939; pp. 2258–2268.
Kienle, R.H., Hovey A.G., "The Polyhydric Alcohol–Polybasic Acid Reaction. I. Glycerol–Phthalic Anhydride"; *The Polyhydric Alcohol–Polybasic Acid Reaction*; vol. 51, Feb., 1929; pp. 509–519.
Emrick, T., Chang, H.-T., Fréchet, M.J.; "An $A_2 + B_3$ Approach to Hyperbranched Aliphatic Polyethers Containing Chain End Epoxy Substituents"; *Macromolecules*; vol. 32; No. 19; pp. 6380–6382.
Malmström, E., Johansson, M., Hult, A.; "Hyperbranched Aliphatic Polyesters"; *Macromolecules*; vol, 28; No. 5; 1995; pp. 1698–1703.
Dvornic, P.R., Tomalia, D.A.; "Molecules That Grow Like Trees"; *Science Spectra*; No. 5, 1996; pp. 36–41.
Miravet, J.F., Fréchet, J.M.J.; "New Hyperbranched Poly(siloxysilanes) from $AB_2$, $AB_4$ and $AB_6$ monomers: Variation of the Branching Pattern and End–Functionalization"; *Polymeric Materials Science and Engineering*; vol. 77, Fall Meeting Sep. 8–11, 1997, Las Vegas Neveda; *Proceedings of the American Chemical Society Division of Polymeric Materials: Science and Engineering*; 1997; pp. 141–142.
Mathias, L.J., Carothers, T.W.; "Hyperbranched Poly(siloxysilanes)"; *J. Am. Chem. Soc.*; vol. 113; 1991; pp. 4043–4044.
Lach, C., Müller, P., Frey, H., Müllhaupt, R., "Hyperbranched Polycarbosilane Macromonomers Bearing Oxazoline Functionalities"; *Macromol. Rapid Commun.*; vol. 18, 1997, pp. 253–260.
Rubinsztajn, S., "Synthesis and Characterization of New Poly(siloxysilanes)"; *Journal of Inorganic and Organometallic Polymers*, vol. 4, No. 1, 1994; pp. 61–77.
Rubinsztajn, S., Stein, J.; "A Silane Functionalized Styrene Monomer and Its Polymerization"; *Journal of Inorganic and Organometallic Polymers*; vol. 5; No. 1; 1995; pp. 43–59.
Mishra, M., Kobayashi, S.; "Star and Hyperbranced Polymers", Copyright® 1999 By Marcel Dekker, Inc, one page.

* cited by examiner

*Primary Examiner*—Robert Dawson
*Assistant Examiner*—Kuo-Liang Peng
(74) *Attorney, Agent, or Firm*—Price, Heneveld, Cooper, DeWitt & Litton

(57) ABSTRACT

Hyperbranched polymers are prepared by a process in which a monomer having the form $A_x$ is reacted with another monomer of the form $B_y$, where A and B are functional groups that do not react with themselves, but do react with each other. The process allows synthesis of hyperbranched polymers having a single type of terminal functional group from comonomers, each of which has a single type of functional group. The invention allows greater flexibility in the preparation of a larger variety of different hyperbranched polymers and enables hyperbranched polymers to be prepared at a lower cost as compared with conventional processes using monomers having two types of functional groups that react during polymerization.

12 Claims, No Drawings

US 6,534,600 B2

HYPERBRANCHED POLYUREAS, POLYURETHANES, POLYAMIDOAMINES, POLYAMIDES AND POLYESTERS

FIELD OF THE INVENTION

This invention relates to the synthesis of polymers from polyfunctional monomers, and more particularly to the synthesis of branched polyureas, polyurethanes, polyamidoamines, polyamides and polyesters.

BACKGROUND OF THE INVENTION

Polyureas, polyurethanes, polyamidoamines, polyamides and polyesters are typically synthesized from difunctional monomers to produce linear polymers, or from a combination of difunctional and polyfunctional monomers to prepare thermoset resins. Thermoplastic and thermoset polyureas, polyurethanes polyamidoamines, polyamides and polyesters have exhibited utility in a variety of applications. However, there is a recognized need for branched, and more particularly for highly branched, thermoplastic polymers. It is now recognized that chemically similar polymers having different molecular architectures can exhibit different properties and advantages. For example, polymer-coating compositions comprising a highly branched polyester have a lower viscosity and better shear thinning properties for coating applications than similar compositions containing a chemically similar linear polyester having the same molecular weight and same concentration.

One method of synthesizing branched polymers is to use polyfunctional monomers (i.e., monomers having three or more functional groups) during polymerization. However, this method may result in the production of gelled or thermoset cross-linked materials that do not exhibit good processability characteristics, and which are insoluble.

It has been suggested that dendrimers can be employed in certain applications to achieve improved properties, such as thermoplastic processing characteristics, lower viscosity, and improved rheology, as compared with linear polymers having similar chemistry and molecular weight. However, dendrimers are monodisperse (typically having a polydispersity of less than about 1.02), highly defined molecules that are prepared by a series of controlled stepwise growth reactions which generally involve protect-deprotect strategies and purification procedures at the conclusion of each step. As a consequence, synthesis of dendrimers is a tedious and expensive process that places a practical limitation on their applicability.

In contrast to dendrimers, hyperbranched polymers are prepared in a one-step, one-pot procedure. This facilitates the synthesis of large quantities of materials, at high yields, and at a relatively low cost. Although the properties of hyperbranched polymers are different from those of dendrimers due to imperfect branching and larger polydispersities, hyperbranched polymers exhibit a degree of branching intermediate between that of linear polymers and dendrimers, and, therefore, exhibit thermoplastic processing and Theological properties that are comparable or for some applications superior to those of dendrimers. Accordingly, hyperbranched polymers have been perceived as being useful in certain applications as a lower cost alternative to dendrimers.

Heretofore, hyperbranched polymers, including hyperbranched polyureas, polyurethanes, polyamidoamines, polyamides and polyesters, have been prepared using a monomer having at least one functionality of one type (A), and at least two functionalities of another type (B), wherein functionalities of the same type are not reactive with each other, and functionalities of the first type are reactive with functionalities of the second type to form hyperbranched polymers via condensation or addition reactions. The monomers employed during synthesis of conventional hyperbranched polymers are designated as $A_xB_y$ monomers, wherein A represents a functional group of a first type that does not react with itself, B represents a functional group of a second type that does not react with itself but reacts with the functional groups of the first type, x is at least 1, and y is at least 2. However, there are relatively few commercially available $A_xB_y$ monomers, and synthesis of such monomers is generally more difficult than synthesis of monomers having a single type of functionality. As a result, the variety of hyperbranched polymers that can be synthesized from $A_xB_y$ monomers is limited and, although they are generally less expensive than dendrimers, they are often too expensive for many applications.

SUMMARY OF THE INVENTION

This invention provides hyperbranched polyureas, polyurethanes, polyamidoamines, polyamides and/or polyesters prepared from difunctional and/or polyfunctional monomers having functional groups of one type (A) without any other functional groups that react significantly during the polymerization process, and difunctional and/or polyfunctional monomers having functional groups of another type (B) that react with a functional groups of the first type (A) without any other functional groups that react significantly during the polymerization process. More specifically, the hyperbranched copolymers of this invention are prepared by a process in which a monomer having the form $A_x$ is reacted with another monomer of the form $B_y$, where A is a functional group that does not react with itself during the polymerization process, B is a functional group that does not react with itself during the polymerization process but participates in an addition or condensation reaction with a first functional group (A) to form a hyperbranched copolymer, x and y are integers which each have a value of at least 2, and at least one of x and y is an integer having a value of at least 3.

The process of this invention enables synthesis of hyperbranched polyureas, polyurethanes, polyamidoamines, polyamides and/or polyesters from comonomers, each of which has a single type of functional group, thereby providing greater flexibility in the preparation of a larger variety of different hyperbranched polyureas, polyurethanes, polyamidoamines, polyamides and/or polyesters. Because $A_x$ and B type monomers are easier to synthesize than $A_xB_y$ type monomers, the process of this invention also enables hyperbranched polyureas, polyurethanes, and/or polyesters to be prepared at a lower cost than conventional synthesis processes.

These and other features, advantages and objects of the present invention will be further understood and appreciated by those skilled in the art by reference to the following specification and claims.

DESCRIPTION OF THE PREFERRED EMBODIMENTS

This invention is directed to hyperbranched polyureas, polyurethanes, polyamidoamines, polyamides and/or polyesters prepared by reacting at least two different monomers, each of which will not react with itself, but will react with the other monomer, wherein at least one of the monomers includes at least three functional groups, and the other monomer is at least difunctional.

It will be understood that the functional groups of a monomer having a plurality of functional groups of the same type may exhibit different reactivities for a reagent. As is well known in the art, different functional groups having the same atoms arranged the same way may exhibit different reactivities due to factors such as steric influences and electron donating or withdrawing characteristics of adjacent chemical moieties to which the functional groups are attached. Such differences in reactivity of functional groups that are otherwise chemically identical do not constitute differences in type. In other words, a monomer having a plurality of functional groups with the same atoms arranged in the same way are functional groups of the same type regardless of whether the functional groups have different reactivities. For example, a trihydric alcohol such as glycerol has two hydroxyl groups bonded to a —CH$_2$—group and a hydroxyl group of lower reactivity bonded to a

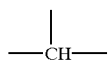

group. Nevertheless, glycerol is regarded as a tri-functional monomer having three functional groups of the same type. Similarly, all amine groups are to be regarded as functional groups of the same type regardless of differences in reactivity, all isocyanate groups are to be regarded as functional groups of the same type regardless of differences in reactivity, and all carboxylic acid groups are to be regarded as functional groups of the same type regardless of differences in reactivity, provided that each of the functional groups is capable of reacting appreciably during polymerization.

It should be understood that the $A_x$ and B monomers may contain other groups that are potentially reactive in other ways. Accordingly, it will be understood that an $A_x$ monomer does not include any functional groups, other than the A-functional groups, that will react appreciably or significantly during the polymerization reaction. Similarly, the By monomers will not contain any functional groups, other than the B-functional groups, that will react appreciably or significantly during the polymerization reaction. This requirement does not exclude the possibility of having other functional groups that are potentially reactive under conditions other than those in which the polymerization is conducted, that do not participate in A+B polymerization and do not prevent it. This requirement also does not exclude monomers having other functional groups that are insignificantly reactive under polymerization conditions, that do not participate in the polymerization reaction and do not prevent the formation of a desired hyperbranched polymer. This process may be represented by the following example when x=2 and y=3:

a) if b/a > 1:

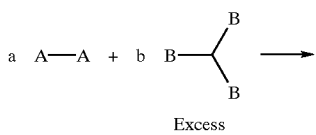

Excess

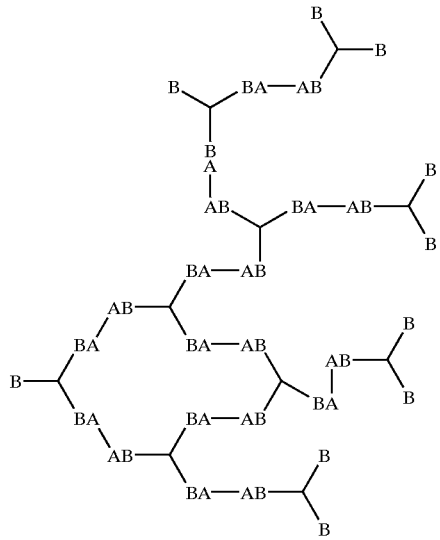

b) if b/a < 1:

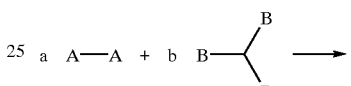

Excess

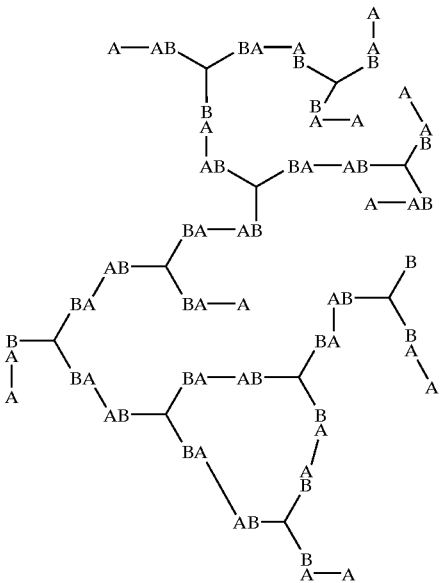

wherein "a" represents the number of $A_2$ molecules and "b" represents the number of $B_3$ molecules. Similar equations can also be written for other corresponding examples in which the parameters x and y may have other values.

For example, in accordance with this invention, a hyperbranched polyurea is synthesized by reacting a multifunctional amine and a multifunctional isocyanate, wherein at least one of the multifunctional amine and the multifunctional isocyanate has a functionality of at least 3 (e.g., the reaction product of a diamine and a triisocyanate or the reaction product of a diisocyanate and a triamine). Similarly, in accordance with the principles of this invention a hyperbranched polyurethane is synthesized by reacting a multifunctional alcohol with a multifunctional isocyanate, wherein at least one of the multifunctional alcohol and the multifunctional isocyanate has a functionality of at least 3, and the other has a functionality of at least 2. Hyperbranched polyamides and hyperbranched polyamidoamines may be prepared by reacting a multifunctional carboxylic acid (i.e., a compound having a plurality of carboxylic acid groups) or a multifunctional carboxylic acid derivative with a multifunctional amine, wherein at least one of the multifunctional carboxylic acid or multifunctional carboxylic acid derivatives and the multifunctional amine has a functionality of at least 3, and the other has a functionality of at least 2. An amine terminated polyamide is formed when the number of amine functional groups exceeds the number of carboxylic acid or carboxylic acid derivative groups, and a carboxylic acid or carboxylic acid derivative terminated polyamide is formed when the number of carboxylic acid or carboxylic acid derivative functional groups exceeds the number of amine groups in the polymerization system. Similarly, hyperbranched polyamidoamines are formed by reacting multifunctional acrylates or their derivatives with multifunctional amines or their derivatives, wherein at least one of the reagents has a functionality of at least 2 while the other has a functionality of at least 3. Also, in accordance with the principles of this invention a hyperbranched polyester is prepared by reacting a multifunctional alcohol and a multifunctional carboxylic acid or carboxylic acid derivative (i.e., a compound having a plurality of carboxylic acid groups and/or one or more acid anhydride, halide, ester or alike groups(s)), wherein at least one of the monomers has a functionality of at least 3, and the other has a functionality of at least 2. Also, combinations of di- and/or multifunctional monomers having functional groups of the same type may be used. For example, a hyperbranched polymer may be prepared in accordance with this invention by reacting a difunctional monomer having functional groups of a first type (e.g., $A_2$), a trifunctional monomer having functional groups of the first type (e.g., $A_3$), and a difunctional monomer having functional groups of a second type (e.g., $B_2$) Suitable compounds having a plurality of amine functional groups, a plurality of isocyanate groups, a plurality of hydroxyl groups, or a plurality of carboxyl groups are well known. Useful multifunctional amines include, but are not limited to, diethylenetriamine, triethylenetetramine, tetraethylenepentamine, dipropylenetriamine, ethylenediamine, tris(2-aminoethyl)amine, aminobenzylamines, aminohydrazides, etc. Mixtures of multifunctional amines can also be used. Useful difunctional isocyanates include, but are not limited to bis(4-isocycanatocyclohexyl)methane, diphenylmethane diisocyanate, isophorone diisocyanate, toluene 2,4-diisocyanate, hexamethylene diisocyanate, m-tetramethylxylene diisocyanate, 1,3-phenylene diisocyanate, etc. Mixtures of multifunctional isocyanates can also be used. The multifunctional isocyanates useful for preparing the hyperbranched polymers of this invention include monomeric multifunctional isocyanates, multifunctional isocyanate adducts and/or isocyanate-terminated prepolymers. Suitable tri-functional isocyanates include 4,4', 4"-triphenylmethane triisocyanate and others. Multifunctional alcohols that are useful for preparing the hyperbranched polymers of this invention include ethylene glycol, propylene glycol, propane diol, butane diol, di(ethylene glycol), tri(ethylene glycol), tetra(ethylene glycol), di(propylene glycol), tri(propylene glycol), tetra (propylene glycol), glycerol, trimethylol propane, pentaerythritol, 1,1,1-tris(hydroxymethyl)ethane, triethanolamine and the like. Useful dicarboxylic acids include such as malonic, dimethylmalonic, succinic, glutaric, adipic, trimethyladipic, pimelic, 2,2-dimethylglutaric azelaic, sebacic, suberic, 1,3-cyclopentanedicarboxylic, 1,2-cyclohexanedicarboxylic, 1,3-cyclohexanedicarboxylic, 1,4-cyclohexanedicarboxylic, phthalic, terephthalic, isophthalic, tetrahydrophthalic, hexahydrophthalic, 2,5-norbornanedicarboxylic, 1,4-naphthalic, diphenic, 4,4'-oxydibenzoic, diglycolic, thiodipropionic, 4,4'-sulfonyldibenzoic, and 2,5-naphthalenedicarboxylic acids. Anhydrides of any of the foregoing are also contemplated. Examples of suitable tricarboxylic acids include, but are not limited to, trimesic acid, trimellitic acid, pyromellitic acid, butanetricarboxylic acid, naphthalene tricarboxylic acids and cyclohexane-1,3,5-tricarboxylic acid. Mixtures of polycarboxylic acid compounds can also be used.

Hyperbranched polymers are polymers having branches upon branches. More specifically, a hyperbranched polymer contains a mixture of linearly and fully branched repeating units, whereas an ideal dendrimer contains only fully branched repeating units, without any linearly repeating units, and ideal linear polymers contain only linear repeating units, without any branched repeating units. The degree of branching (DB), which reflects the fraction of branching sites relative to a perfectly branched system (i.e., an ideal dendrimer), for a hyperbranched polymer is greater than zero and less than 1, with typical values being from about 0.25 to 0.45.

The average degree of branching ($\overline{DB}$) is defined as the number average fraction of branching groups per molecule, i.e., the ratio of terminal groups plus branched groups to the total number of terminal groups, branched groups, and linear groups. For ideal dendrons and dendrimers the degree of branching is 1. For ideal linear polymers the degree of branching is 0. The degree of branching is expressed mathematically as follows:

$$\overline{DB} = \frac{N_t + N_b}{N_t + N_b + N_l}$$

where $N_t$ represents the number of terminal units, $N_b$ represents the number of branched units, and $N_l$ represents the number of linear units.

Unlike ideal dendrimers which have a polydispersity of 1, hyperbranched polymers have a polydispersity that increases with increasing molecular weight, with typical polydispersities being greater than 1.1 even at a relatively low molecular weight such as 1,000 Daltons, and with polydispersities greater than 2 being typical for hyperbranched polymers having a molecular weight of about 10,000 Daltons or higher. These differences between the polydispersities and degree of branching of hyperbranched polymers verses dendrimers is indicative of the relatively higher non-ideality, randomness and irregularity of hyperbranched polymers as compared with dendrimers, and distinguishes hyperbranched polymers from dendrimers.

An important aspect of this invention relates to control of the polymerization process to prevent gelation (i.e., cross-linking) of the copolymer. For the copolymerization processes of this invention, the ratio (r) of A-groups to B-groups (r=A/B), and/or the extent of reaction (p) are selected so as to avoid cross-linking. A hyperbranched polymerization system can be approximately modeled by assuming that (a) A-groups only react with B-groups, and B-groups only react with A-groups, (b) cyclization reactions do not occur, (c) all A-groups exhibit equal reactivity regardless of the size and shape of the molecule to which they are attached, and (d) all B-groups exhibit equal reactivity regardless of the size and shape of the molecule to which they are attached. Using these assumptions for the general system $A_x+B_y$, it can be theoretically determined that complete conversion of the minor component can be achieved without gelation if $1/[(x-1)(y-1)] \geq r \geq (x-1)(y-1)$. As an example, complete conversion of the minor component can be achieved for an $A_2+B_3$ system without gelation when the ratio of A-groups to B-groups is less than 0.5 or greater than 2. As an alternative, gelation can be avoided by controlling the extent of conversion (completion) of the reaction. As an example, for an $A_x+B_y$ system, it can be theoretically determined that gelation can be avoided when r=1 (i.e., the number or concentration of A-groups is equal to the number or concentration of B-groups) if the extent of reaction (p) is less than $[1/(x-1)(y-1)]^{1/2}$. For example, for an $A_2+B_3$ system in which the number of A and B groups are equal, gelation can be avoided if the reaction is terminated at or below about 70% completion. Methods of quenching, or otherwise stopping a polymerization reaction at a desired extent of conversion are known and will not be described in detail.

Generally, gelation can be avoided by selecting the extent of reaction (p), the ratio of reactive groups (r), the number of A-functional groups per molecule of A-functional monomer (x), and the number of B-functional groups per molecule of B-functional monomer (y) so that the relation $rp^2 \leq 1/[(x-1)(y-1)]$ is satisfied. In the case where either A-groups or B-groups are in excess (i.e., r≠1), the extent of reaction (p) is determined with respect to the minor reactant (the lesser of A and B), and r is the ratio of the minor to the major component.

Because the above relationships are dependent on assumptions that only approximate real systems, the actual degree of conversion that can be achieved for a given ratio of A-groups to B-groups before gelation occurs tends to be slightly higher than the theoretically predicted conversion. However, the theoretically determined conversion is an excellent starting point from which to conduct experiments to determine the actual allowable extent of conversion before gelation occurs. Similarly, the allowed ranges for the ratio of A-groups to B-groups for a given extent of conversion without the occurrence of gelation for a real system may be somewhat broader than the theoretically predicted ranges. However, the theoretically predicted ranges provide an excellent starting point for a series of experiments to determine how close to r=1 a system can be before gelation occurs.

Suitable reaction conditions, such as temperature, pressure and solvents, and suitable catalysts are the same as those used for conventional thermosetting and linear polymerizations of polyureas, polyurethanes, polyamidoamines, polyamides and polyesters, respectively. These conditions and catalysts are well known and will not be described in detail.

The polymerization processes of this invention may be performed using bulk or solution polymerization techniques. The monomers may be added to a reaction vessel either together or separately, and may be added all at once, incrementally, or continuously. The copolymerization reactions of this invention are preferably achieved as a batch process in a single reaction vessel. However, it is contemplated that the processes of this invention may be amenable to continuous reaction processes, such as continuous stirred tank reactors and plug flow reactors. However, the processes of this invention do not encompass an iterative sequence of reactions and separations of the type associated with the synthesis of dendrimers.

The hyperbranched polymers prepared by the processes of this invention will typically have a degree of branching of less than 55%, and more typically from about 25% to about 45%. Their typical polydispersities may range from about 1.1 for lower molecular weight hyperbranched polymers (e.g., those having a molecular weight of about 1,000 Daltons) to 2 or higher for higher molecular weight hyperbranched polymers (e.g. those having a molecular weight of 10,000 Daltons or more). The hyperbranched polymers that are prepared in accordance with the processes of this invention typically have a weight average molecular weight of about 25,000 Daltons or less. However, higher molecular weight hyperbranched polymers can be prepared. The typical molecular weights for the hyperbranched polymers prepared in accordance with this invention are from about 1,000 (weight average) to about 25,000 (weight average), and more typically from about 1,000 to about 10,000 Daltons (weight average).

The hyperbranched polyureas of this invention may be prepared by combining a diamine or polyamine and a diisocyanate or polyisocyanate, with the number of amine groups exceeding the number of isocyanate groups to provide an amine terminated polyurea. Alternatively, the polymerization may be conducted with an excess of isocyanate groups to provide an isocyanate terminated polyurea. Likewise, polyurethanes may be prepared from a diol or polyol and a diisocyanate or polyisocyanate, with either the hydroxyl groups in excess to form a hydroxyl terminated polyurethane, or with the isocyanate groups being in excess to form an isocyanate terminated polyurethane. Similarly, depending upon whether hydroxyl or carboxyl groups are in excess, hydroxyl terminated polyesters or carboxyl terminated polyesters may be formed.

The surface of the hyperbranched polyureas, polyurethanes, polyamidoamines, polyamides and polyesters of this invention can be chemically modified to provide generally any desired surface functionality. Surface functionality can be modified to facilitate subsequent reactions and/or to impart desired solubility properties. For example, an amine-, hydroxyl-, or carboxyl-terminated hyperbranched polymer can be reacted with an epoxy-terminated alkane (e.g., 1,2-epoxydecane) or polysiloxane to form a hyperbranched polymer having a hydrophobic surface. As another example, an amine terminated polyurea or polyamidoamine may be reacted with a compound having a single isocyanate group and one or more alkoxy groups bonded to a silicon atom (e.g., isocyanatopropyltriethoxysilane) to form a moisture curable siliconized hyperbranched polyurea or polyamidoamine system.

In general, the hyperbranched polyureas, polyurethanes polyamidoamines, polyamides and polyesters of this invention may be covalently connected to each other to form nano-domain-structured networks using alpha,omega-telechelic linear polymers or oligomers, multifunctional linear polymers with functional groups pendant to the main chain backbone, and/or multifunctional randomly branched polymers having functional groups regularly or randomly distributed in the main or in the side chains. Other types of connectors may include the residue of di- or multifunctional non-polymeric cross-linking agents or even a single atom that can connect hyperbranched polymer end groups. For example, an oxygen atom can act as a connector between silicon-containing moieties when water is reacted with alkoxysilane functional groups in a condensation reaction. The connectors may also include multi-arm star polymers, dendrimers, dendrons, homologously derivatized or other hyperbranched polymers or other architecturally specific macromolecules. Nano-domain networks formed from the hyperbranched polyureas, polyurethanes, polyamidoamines, polyamides or polyesters of this invention may be viewed as three-dimensional, cross-linked materials comprising covalently bonded nanoscopic, hyperbranched domains which may be of the same or different chemical composition than the rest of the network. These materials may be formed into clear, highly transparent films, sheets, membranes, coatings or other objects, and may exhibit different glass transition temperatures that may rank them among either elastomers or plastomers. The materials may also exhibit high thermal stability, mechanical strength and toughness, and may offer new ways of preparing specialty membranes, protective coatings, photoresists, novel composites, controlled porosity materials, etc. Other applications may be found in biomedical areas, medical science and engineering, purification of liquids and gases, food processing, storage and packaging, printing and lithography, sensors, catalysts, etc. In many applications, such as coatings, the hyperbranched polymers may exhibit lower viscosity at any given solids content as compared with conventional compositions using linear or lightly branched polymers, and in contrast to dendrimers may exhibit desirable shear-thinning properties for certain applications.

The hyperbranched polyureas, polyurethanes, polyamidoamines, polyamides and polyesters of this invention may be subjected to surface modifications to provide a hydrophobic organosilicon exterior layer. The organsilicon layer can, for example, be formed by reacting an amine terminated polyurea, polyamidoamine or polyamide with a silicon-containing compound such as a carbosilane, silazine, silane, siloxane and combinations thereof. Examples include silanes or siloxanes of the respective formulae $XSiR_nY_{(3-n)}$ or $XR_pY_{(2-p)}Si(OSiR_2)_mOSiR_nY_{(3-n)}$ wherein m represents zero or a positive integer; n represents zero, 1, 2 or 3; and p represents zero, 1 or 2. X is any group that reacts with a terminal amine, such as $CH_2=CHCOO(CH_2)_3-$, $Cl(CH_2)_a-$, $Br(CH_2)_a-$ or $I(CH_2)_a-$. Other groups that can react with an amine group, such as epoxy, $ClCO(CH_2)_a-$, $ROCO(CH_2)_a-$, or $OCN-R-$, wherein a in these groups represents an integer typically having a value of 1 to 6. Preferably each R is independently an alkyl radical containing 1 to 6 carbon atoms, most preferably methyl, an aryl radical such as phenyl, or a fluoroalkyl radical such as $-(CH_2)CF_3$ or $-(CH_2)_2(CF_2)_3CF_3$. Y represents a group that does not react with $-NH_2$ such as the vinyl group $CH_2=CH-$, the allyl group $CH_2=CH-CH_2-$, $-OR$, hydrogen, a triorganosiloxy radical, or a ferrocenyl radical.

Representative examples of organosilicon compounds that can be used herein include (3-acryloxypropyl) methyldimethoxysilane, (3-acryloxypropyl bis (vinyldimethylsiloxy) methylsilane, (3-acryloxypropyl)tris (trimethylsiloxy)silane, iodomethyltrimethylsilane, chloromethyltrimethylsilane, or chloromethyldimethylvinylsilane, etc. Similarly, hydroxyl terminated hyperbranched polyurethanes and hydroxyl terminated hyperbranched polyesters can be provided with an organosilicon outer layer by reaction with the above silanes or siloxanes, wherein X is any group that reacts with $-OH$, such as a carboxyl group or an isocyanate group. In an analogous manner, isocyanate terminated hyperbranched polyureas, isocyanate terminated hyperbranched polyurethanes, and carboxyl terminated hyperbranched polyesters can be reacted with silanes or siloxanes as set forth above, wherein X is a group that is reactive with the terminal groups of the hyperbranched polymers (e.g., isocyanate groups or carboxyl groups). The resulting organosilicon surface modified hyperbranched polyureas, polyurethanes, polyamidoamines, polyamides and polyesters can be cross-linked by various mechanisms depending on the Y functional groups of the silanes or siloxanes. Possible cross-linking mechanisms include but are not limited to hydrosilation, hydrolysis/condensation reactions in the presence of moisture, or vinyl addition reactions.

The following examples are illustrative of particular embodiments of the invention.

EXAMPLE 1

Preparation of Amine-Terminated Hyperbranched Polyurea

A 500 mL round bottom flask was charged with tris(2-aminoethyl)amine (10.00 g, 0.0684 mol) and anhydrous THF (150 mL). The flask was flushed with $N_2$ for 2 minutes. The solution was cooled to $-78°$ C., followed by dropwise addition of THF (anhydrous, 20 mL) solution of isophorone diisocyanate (IPDI) (7.60 g, 0.0342 mol) with stirring. It was stirred for 2 hours and then allowed to warm up to room temperature. It was further stirred at room temperature for 16 hours. THF solvent was removed by a rotavap to yield a sticky paste. The paste was washed with diethyl ether (2×20 mL), re-dissolved in 200 mL methanol and filtered. The filtrate was evaporated to dryness on rotavap and dried in vacuum for 16 hours. A white solid (12.37) designated as HB-IPDI-$(NH_2)_x$ was collected. $^1$H NMR in $CD_3OD$: 0.94 ppm (s); 1.03 ppm(s); 1.05 ppm(s) overlapped with broad and weak multiplet ranging from 0.809 to 1.17 ppm; 1.58 ppm(b, m); 2.53 ppm (t); 2.74 ppm(t); 2.85 ppm (b, s); 3.11 ppm (b, s); 3.17 ppm (b, s); 3.32 ppm (s); 3.8 ppm (b); 6.21 ppm (b). Selected assignments of $^1$H NMR spectrum: 0.94 ppm (s, $CH_3$); 1.03 ppm (s, $CH_3$); 1.05 ppm (s, $C8H_3$); 2.53 ppm (t, [—($C\underline{H}_2$)$_2$—]); 2.74 ppm (t, [—($C\underline{H}_2$)$_2$—]); 3.21 ppm (s, [—($CH_3$)$_3C_6H_6C\underline{H}_2$NHCONH—]); 6.21 ppm (b and weak, [(—N$\underline{H}$)$_2$CO]). $^{13}$C{$^1$H} NMR in $CD_3OD$: 18.66 ppm (s); 24.07–24.55 ppm (m); 28.46 ppm (s); 29.26 ppm (s); 30.14 ppm (s); 30.71 ppm (b, m); 32.70 ppm (s); 32.93 ppm (s); 32.97 ppm (s); 35.96 ppm; 37.76 ppm (m); 39.24–39.99 ppm (m); 40.97 ppm(s); 41.79 ppm (s); 43.08 ppm(s); 43.60 ppm (s); 44.51 ppm(s); 45.60 ppm(s); 47.06 ppm(s); 47.92 ppm (s); 48.30 ppm (s); 50.63 ppm(s); 52.04 ppm(s); 55.03 ppm(s); 56.10 ppm(s); 56.66 ppm(s); 56.98 ppm(s); 57.07 ppm(s); 57.16 ppm(s); 58.19 ppm(s); 58.38 ppm (s); 160.69 ppm(s); 161.57 ppm(s); 165.90 ppm (s); 166.00 ppm(s). Selected assignments in $^{13}$ C{$^1$H} NMR spectrum: 18.66 ppm (s, [O($CH_2\underline{C}H_3$)$_2$]); 24.07–24.55 ppm (m, $CH_3$); 28.46 ppm (s, $CH_3$); 29.26 ppm (s, $CH_3$); 30.14 ppm (s, $CH_3$); 30.71 ppm (b and m, $CH_3$); 35.96 ppm (s, $CH_3$); 39.24–39.99 ppm (m $CH_2$); 40.97 ppm (s, $CH_2$); 41.79 ppm (s, $CH_2$); 43.08 ppm (s, $CH_2$); 43.60 ppm (s, $CH_2$); 45.60 ppm (s, $CH_2$); 47.06 ppm (s, $CH_2$); 47.92 ppm (s, $CH_2$); 48.30 ppm (s, $CH_2$); 50.63 ppm (s, $CH_2$); 52.04 ppm (s, $CH_2$); 55.03 ppm (s, $CH_2$); 56.10 ppm (s, $CH_2$); 56.66 ppm (s, $CH_2$); 56.98 ppm (s, $CH_2$); 57.07 ppm (s, $CH_2$); 57.16 ppm (s, $CH_2$); 58.19 ppm (s, $CH_2$); 58.38 ppm (s, $CH_2$); 44.51 ppm [s, (CH) in cyclohexyl]; 160.69 ppm [s, (—NH$\underline{C}$ONH—)]; 161.58 ppm [s, (NH$\underline{C}$ONH)]; 165.89 ppm [s, (NR$\underline{C}$ONH)]; 166.00 ppm [s, (NH$\underline{C}$ONH)]. IR on KBr pellet (selected peaks): 3353 cm$^{-1}$ [broad and strong, $v(-NH_2)$ and $v(-NH-)$]; 1643 cm$^{-1}$ [strong, $v(C=O)$]; 1566 cm$^{-1}$ [strong, $v(CNH)$ of amide]. MALDI-TOF (matrix: 2,5-Dihydroxybenzonic acid): 12 apparent groups (550.8 m/z, 740.0 m/z, 904.2/z, 1095.5 m/z, 1249.6 m/z, 1429 m/z, 1604.5 m/z, 1785.4 m/z, 1958.4 m/z, 2145.6 m/z, 2321.8 m/z, 2508.0 m/z) within the total range from 500 to 3200 m/z together with some weak groups at two ends of the range. GPC[Column set: Plgel C(2X) (at 80° C.). Solvent: NMP(0.1% LiBr), Detector DRI (50° C.), Standards: polystyrene 800–300,000]: Mn 564. Mw 831. Polydispersity 1.44.

EXAMPLE 2
Preparation of Hyperbranched Polyurea having Partially Siliconized Amine End-Groups of Polymer from Example 1 with Mono-(2,3-epoxy)propylether Terminated Polydimethylsiloxane (MW 5,000)

A 250 mL round flask was charted with HB-IPDI-$(NH_2)_x$ (0.50 g), mono-(2,3-epoxy)propylether terminated polydimethylsiloxane $CH_2OCHCH_2OC_3H_6(SiMe_2O)_n$ $SiMe_2Bu''$ (MW 5,000, 3.64 g), 10 mL THF and 10 mL methanol. The solution was heated at reflux for 3 days. Volatiles were then removed by a rotavap. The residue was extracted into diethyl ether (100 mL). After diethyl ether was removed on rotavap, a gel-like solid (3.73 g) designated as HB-IPDI-$[N(H)_{2-z}(CH_2CH(OH)CH_2OC_3H_6(SiMe_2O)_nSiMe_2Bu'')_z]_x$ (O<Z<=2) was obtained. $^1$HNMR in $CDCl_3$: −0.05 ppm (strong s with satellites, [Si(CH$_3$)]; a complex multiplex of various signals between 0.12–3.811 ppm that cannot be precisely assigned. IR on KBr disc (with selected assignments): 3315 cm$^{-1}$ [broad and weak, v(NH and NH$_2$)]; 2965 cm$^{-1}$ [strong, v(CH$_3$)]; 2905 cm$^{-1}$; 1636 cm$^{-1}$ [weak, v(C=O)]; 1568 cm$^{-1}$ [weak, v(CNH) of amide]; 1442 cm$^{-1}$; 1412 cm$^{-1}$; 1382 cm$^{-1}$; 1264 cm$^{-1}$ [strong, v(Si—CH$_3$)];1094 cm$^{-1}$ [strong, v(Si—O—Si)]; 1022 cm$^{-1}$ [strong, v(Si—O—Si)]; 866 cm$^{-1}$; 802 cm$^{-1}$; 707=662 cm$^{-1}$.

EXAMPLE 3
Curing of Hyperbranched Polymer of Example 2 with an Alpha, Omega-Telechelic Epoxypropoxypropyl Terminated Polydimethylsiloxane (MW 4,500–5,500)

Hyperbranched polyurea HB-IPDI-$[N(H))_{2-z}(NHCH_2CH(OH)CH_2OC_3H_6(SiMe_2O)_nSiMe_2Bu'')_z]$ (O<Z<=2) of Example 1 (0.1000 g) and epoxypropoxypropyl terminated polydimethylsiloxanes $CH_2OCHCH_2OC_3H_6$ (SiMe$_2$O)$_n$SiMe$_2$C$_3$H$_6$OCH$_2$CHOCH$_2$ (MW 4,500–5,500, 0.1750 g) were dissolved in 5 mL THF in a 15 mL vial to form a homogenous solution. The solution was evaporated to dryness by blowing N$_2$ at the surface of the solution, and the residue was cured at 110° C. for 1 hour. The obtained solid was washed by THF (2×10 mL) and dried at 110° C. for 0.5 hours to give 0.23 g insoluble solid.

EXAMPLE 4
Curing of the Hyperbranched Polyurea of Example 1 with Alpha, Omega-Telechelic Epoxypropoxvpropyl Terminated Polydimethylsiloxanes Hyperbranched polyurea HB-IPDI-$(NH_2)_x$ of Example 1 (0.0102 g) and epoxypropoxypropyl terminated polydimethylsiloxanes $CH_2OCHCH_2OC_3H_6(SiMe2O)_n$ SiMe$_2$C$_3$H$_6$OCH$_2$CHOCH$_2$ (MW 4,500–5,500, 0.200 g) were dissolved in 1 mL 2-propanol to form a homogenous solution. The solution was evaporated to dryness by blowing N$_2$ at the surface of the solution. The resulting viscous oil was cast on a Ti-coated PET plate and cured at 110° C. for 20 hours to yield an insoluble clear coating.

EXAMPLE 5
Preparation of Ethoxysilyl-Terminated Polyurea from the Hyperbranched Polyurea of Example 1 and 3-isocynatopropyltriethoxysilane A 500 mL round bottom flask was charged with hyperbranched polyurea HB-IPDI-$(NH_2)_x$ of Example 1 (6.00 g) and anhydrous THF (60 mL). It was flushed for 1 minute with N$_2$, and 3-isocyantopropyltriethoxysilane (12.00 g, 48.51 mmol) was added dropwise. The solution was heated at reflux for 17 hours. The volatiles were then evaporated under reduced pressure to approximate 20 mL remaining volume. 400 mL hexanes were added, and the precipitates settled in about 10 minutes. The liquid was decanted and the residue was re-dissolved in 100 mL anhydrous THF. 400 mL hexanes was added again; the liquid was decanted and precipitate was dried in vacuum for 16 hours to yield an off white solid (10.64 g), designated HB-IPDI-$[Si(OEt)_3]_x$. $^1$H NMR in $CDCl_3$ (selected assignments): 0.58 ppm[broad s, (CH$_2$Si)]; 0.88 ppm (broad s); 0.98 ppm (broad s); 1.02 ppm (broad s); 1.18 ppm [t, (OCH$_2$CH$_3$)]; 1.56 ppm (broad s); 2.48 ppm (broad s); 2.76 ppm (broad s); 3.10 ppm (broad s); 3.77 ppm [q, (OCH$_2$CH$_3$)]; 5.77 ppm (broad, [CONH—]); 6.09 ppm (broad, [CONH—]). $^{13}$C{$^1$H} NMR in $CDCl_3$: 7.81 ppm [s, (CH$_2$Si)]; 18.15 ppm [s, (CH$_2$CH$_3$)]; 23.72 ppm [s, (CH$_2$CH$_2$CH$_2$Si)]; 27.72 ppm (s); 31.72 ppm (s); 35.71 ppm (s); 38.50 ppm (s); 42.90 ppm (s, [—CONHCH$_2$(CH$_2$)$_2$ Si]); 46.45 ppm (s); 55.17 ppm (s); 58.35 ppm [s, (OCH$_2$CH$_3$)]; 158.54–160.56 ppm [m, (CONH)]. $^{29}$Si{$^1$H} NMR in $CDCl_3$: —44.08 ppm (s, [Si(OEt)$_3$]). IR on KBr pellet (selected assignments): 3330 cm$^{-1}$; [strong, v(NH)]; 2986 cm$^{-1}$ [strong, v(CH$_3$)]; 2930 cm$^{-1}$; 1642 cm$^{-1}$ [strong, v(CO)]; 1563 cm$^{-1}$; [strong, v(CNH) of amide]; 1479 cm$^{-1}$; 1456 cm$^{-1}$; 1391 cm$^{-1}$; 1251 cm$^{-1}$; 1363 cm$^{-1}$; 1297 cm$^{-1}$; 1251 cm$^{-1}$; 1195 cm$^{-1}$; 1167 cm$^{-1}$; 1107 cm$^{-1}$; 1079 cm$^{-1}$; 958 cm$^{-1}$; 888 cm$^{-1}$; 860 cm$^{-1}$; 772 cm$^{-1}$; 647 cm$^{-1}$; MALDI-TOF (matrix 2,5-trihydroxyacetonphenone): 7 apparent peaks (623.6 m/z, 890.8 m/z, 1271.5 m/z, 1492.9 m/z, 1683.6 m/z, 1866.2 m/z, 2094.1 m/z, 2281.5 m/z, 2693.8 m/z 3292.1 m/z) together with some weak peaks within the total range from 599 to 4000 m/z. GPC [Column set: Plgel C(2X) (at 80° C.). Solvent: NMP(0.1% LiBr). Detector DRI (50° C.), Standards: polystyrene 800–300,000]: Mn 2746. Mw 6166. Polydispersity 2.25.

EXAMPLE 6
Curing of the Ethoxysilyl-Terminated Polyurea of Example 5 with Alpha, Omega-Telechelic Silanol Terminated Polydimethylsiloxane A 10 mL vial was charged with silanol terminated polydimethylsiloxane HOSiMe$_2$O(SiMe$_2$O)$_n$SiMe$_2$OH (MW 4200, 1.20 g), THF (0.5 mL) solution of bis(2-ethylhexanoate)tin (95% containing free 2-ethylhexanoic acid) (0.070 g), and 2-propanol (3 mL) solution of hyperbranched polymer HB-IPDI-$[Si(OEt)_3]_x$ of Example 5 (0.20 g). The solution was stirred for 48 hours. The solution was then evaporated to dryness by blowing N$_2$ at the surface. The obtained viscous oil was dissolved in 3 mL octane to serve as a coating solution. A 2-propanol solution of HB-IPDI-$[Si(OEt)_3]_x$ (0.15 g/mL) containing 2% of bis(2-ethylhexanoate)tin was cast to Ti coated PET plate to form a prime coating. The octane coating solution was then cast onto this prime coating, and cured at 120° for 24 hours to form an insoluble clear coating.

EXAMPLE 7
Moisture Condensation Curing of the Ethoxysilyl-Terminated Polyurea of Example 5

A 10 mL vial was charged with HB-IPDI-$[Si(OEt)_3]$, (0.3930 g) and 3 ml 2-propanol. To the resulting solution was added bis(2-ethylhexonoate)Tin (95%; containing free 2-ethylhexanoic acid) (0.0200 g). The solution was poured into a polystyrene weight dish (Approx i.d. size 1.5"×1", Cat. No. 2-202A, Vendor Fish Scientific). The solution was evaporated to dryness in the air for 4 hours, then cured at 90° C. for 15 hours. A hard, scratch resistant off-white film was obtained.

EXAMPLE 8
Preparation of Acrylate Monomer

A 200 mL round bottom flask was charged with methyl acrylate (21.2 g, 0.246 mol) and 20.2 g of methanol, and the solution was cooled to 0° C. A pre-cooled methanol solution (5 mL) of tris(2-aminoethyl)amine (5.0 g, 0.0342 mol) at 0° C. was added dropwise from an additional funnel. The resulting mixture was allowed to warm to room temperature with stirring, and it was stirred at that temperature for two days. All volatiles including unreacted material were removed at 40° C. by rotavap in vacuum. The residue was redissolved in 50 mL methanol, volatiles were removed at 40° C. again by rotavap in vacuum. This purification procedure was repeated 5 times. The obtained crude product [N(CH$_2$CH$_2$N(CH$_2$CH$_2$COOCH$_3$)$_2$)$_3$, an (A$_6$) type monomer] was further dried in vacuum oven at room temperature for 16 h to produce an off-white viscous oil (20 g, yield 88%). $^{13}$C{$^1$H} NMR in CDCl$_3$: 172.03 ppm (C=O); 53.23 ppm [N(CH$_2$)$_2$N]; 52.01 ppm [N(CH$_2$)$_2$N]; 51.23 ppm (OCH$_3$); 49.58 ppm (CH$_2$CH$_2$COOCH$_3$); 32.38 ppm (CH$_2$COOCH$_3$). ESI mass spectrum (m/z): 663.4 (M$^+$+H), 685.4 (M$^+$+Na). Calculated molecular weight: 662.4.

EXAMPLE 9

Preparation of Hyperbranched Polyamidoamine

A 200 mL round bottom flask was charged with N(C$_2$H$_4$NH$_2$)$_3$(23.0 g, 0.157 mol) and 3 mL methanol, and the solution was cooled to 0° C. in an ice bath. N(CH$_2$CH$_2$N(CH$_2$CH$_2$COOCH$_3$)$_2$)$_3$ (5.0 g., 0.0075 mol) was added dropwise. The resulting mixture was allowed to warm to room temperature with stirring, and it was further stirred at that temperature for two days. After the volatiles were removed by rotavap, the residue was washed by ethyl ether (5×50 mL). It was dried in rotavap and then in a vacuum oven at room temperature for 4 h to produce an off-white viscous oil (20 g). $^{13}$C{$^1$H} NMR in CDCl$_3$: 172.6–172.0 ppm [C=O]; 57.3–56.1 ppm [NCH$_2$CH$_2$NH$_2$]; 53.15 ppm [N(CH$_2$)$_2$N]; 52.3 ppm [N(CH$_2$)$_2$N]; 50.99 ppm [CONHCH$_2$CH$_2$NC$_2$H$_4$NH$_2$], 50.04 ppm [NCH$_2$CH$_2$CONH—]; 39.55 ppm, and 39.49 ppm [(CH$_2$NH$_2$], 37.60 ppm [CONHCH$_2$]; 33.61 ppm [(CH$_2$CONH—]. ESI-mass spectrum: 969.9 m/z, 1002.1 m/z, 1055.7 m/z, 1077.9 m/z, 1129.3 m/z, 1202.2 m/z, 1224.4 m/z, 1287.0 m/z, 1348.2 m/z, 1370.4 m/z, 2403.3 m/z, 2696.8 m/z, 3606.8 m/z. MALDI-TOF (matrix: dihydroxybenzoic acid): 7 major group peaks centering at 1081.9 m/z, 1228.5 m/z, 1375.3 m/z, 2147.3 m/z, 2294.0 m/z, 2587.7 m/z.

The above descriptions are considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A compound that comprises the reaction product of a hyperbranched polymer having terminal functional groups, and a silicon-containing compound.

2. The compound of claim 1, wherein the silicon-containing compound is selected from the group consisting of carbosilanes, silazines, silanes, siloxanes, and combinations thereof.

3. A compound of claim 1 that comprises the reaction product of a hyperbranched polymer having terminal functional groups, and a silane or siloxane of the respective formulae XSiR$_n$Y$_{(3-n)}$ or XR$_p$Y$_{(2-p)}$Si(OSiR$_2$)$_m$OSiR$_n$Y$_{(3-n)}$, wherein m is zero or a positive integer; n is zero, 1, 2 or 3; p is zero, 1 or 2; X is any group that reacts with one of the terminal functional groups of the hyperbranched polymer, Y is a group that does not react with the terminal functional groups of the hyperbranched polymer, and each R is independently an alkyl radical containing 1 to 6 carbon atoms, an aryl radical, or a fluoroalkyl radical.

4. The compound of claim 3, wherein the terminal functional groups of the hyperbranched polymer are amine groups, and X is a group that reacts with one of the terminal amine groups.

5. The compound of claim 4, wherein X is a reactive group selected from the group consisting of CH$_2$=CHCOO(CH$_2$)$_3$—, Cl(CH$_2$)$_a$—, Br(CH$_2$)$_a$— or I(CH$_2$)$_a$—, epoxy, ClCO(CH$_2$)$_a$—, ROCO(CH$_2$)$_a$—, and OCN—R—, wherein a is an integer having a value of 1 to 6.

6. The compound of claim 3, wherein Y is selected from the group consisting of vinyl, allyl, alkoxy, hydrogen, halogen, haloalkyl, triorganosiloxy radical and ferrocenyl radical.

7. A hyperbranched polymer network comprising the cross-linked reaction product of a hyperbranched polymer having an organosilicon exterior layer and a difunctional or multifunctional cross-linking molecule, wherein the hyperbranched polymer having an organosilicon exterior layer is the reaction product of a hyperbranched polymer having terminal functional groups reacted with a silicon-containing compound.

8. The network of claim 7, wherein the cross-linking molecule is an alpha,omega-telechelic difunctional polymer.

9. The network of claim 7, wherein the cross-linking molecule is a difunctional or multifunctional cross-linking polymer.

10. The network of claim 9, wherein the cross-linking polymer is selected from the group consisting of dendrimers, dendrons, dendrigrafts and hyperbranched polymers.

11. The network of claim 7, wherein the cross-linking molecule is a difunctional or multifunctional non-polymeric cross-linking agent.

12. A hyperbranched polymer network comprising the reaction product of a hyperbranched polymer having an organosilicon exterior layer, wherein hyperbranched polymer molecules are connected to each other through an oxygen atom, and wherein the network is formed by a condensation reaction of alkoxysilyl or silanol functional groups.

* * * * *

UNITED STATES PATENT AND TRADEMARK OFFICE
CERTIFICATE OF CORRECTION

PATENT NO. : 6,534,600 B2
DATED : March 18, 2003
INVENTOR(S) : Petar R. Dvornic et al.

It is certified that error appears in the above-identified patent and that said Letters Patent is hereby corrected as shown below:

Column 1,
Line 59, "theological" should be -- rheological --.

Column 2,
Line 30, delete "a".
Line 51, after "B" insert -- $_y$ --.

Column 3,
Line 38, after "B" insert -- $_y$ --.
Line 44, "By" should be -- $B_y$ --.

Column 11,
Line 31, after "SiMe$_2$Bu")$_z$]" insert -- $_x$ --.

Column 12,
Line 12, "[s, (CH$_2$ C$\underline{H}_2$ CH$_2$ Si)]" should be -- [s, (CH$_2$ $\underline{C}$H$_2$ CH$_2$ Si)] --
Line 26, after "2693.8 m/z" insert -- , -- (comma).
Line 54, after "HB-IPDI-[Si(OEt)$_3$]" insert -- $_x$ --.

Column 13,
Line 33, "[NCH$_2$ CH$_2$ NH$_2$]" should be -- [N$\underline{C}$H$_2$ CH$_2$ NH$_2$] --.
Line 36, "[($\underline{C}$H$_2$ NH$_2$]" should be -- [CH$_2$ NH$_2$] --.
Line 37, "[($\underline{C}$H$_2$ CONH-]" should be -- [$\underline{C}$H$_2$ CONH-] --.

Signed and Sealed this

Twenty-third Day of September, 2003

JAMES E. ROGAN
*Director of the United States Patent and Trademark Office*